(12) United States Patent
Han et al.

(10) Patent No.: US 9,507,076 B2
(45) Date of Patent: Nov. 29, 2016

(54) BACKLIGHT UNIT AND LIQUID CRYSTAL DISPLAY DEVICE INCLUDING THE SAME

(75) Inventors: Jae-Jung Han, Seoul (KR); Dae-Yong Kim, Goyang-si (KR)

(73) Assignee: LG DISPLAY CO., LTD., Seoul (KR)

(*) Notice: Subject to any disclaimer, the term of this patent is extended or adjusted under 35 U.S.C. 154(b) by 8 days.

(21) Appl. No.: 13/461,435

(22) Filed: May 1, 2012

(65) Prior Publication Data

US 2013/0162932 A1    Jun. 27, 2013

(30) Foreign Application Priority Data

Dec. 23, 2011 (KR) .................. 10-2011-0140822

(51) Int. Cl.
*G02F 1/1335* (2006.01)
*F21V 8/00* (2006.01)

(52) U.S. Cl.
CPC ............. *G02B 6/0058* (2013.01); *G02B 6/003* (2013.01); *G02B 6/0036* (2013.01); *G02B 6/0043* (2013.01); *G02B 6/0055* (2013.01); *G02B 6/0068* (2013.01); *G02B 6/0078* (2013.01)

(58) Field of Classification Search
CPC .................................................. G02B 6/0036
USPC ................................................. 362/623, 625
See application file for complete search history.

(56) References Cited

U.S. PATENT DOCUMENTS

| | | | | |
|---|---|---|---|---|
| 5,438,484 A * | 8/1995 | Kanda | ................. | G02B 6/0051 362/613 |
| 7,286,193 B2 * | 10/2007 | Yoo et al. | ....................... | 349/62 |
| 8,240,906 B2 * | 8/2012 | Kim et al. | .................... | 362/615 |
| 8,529,116 B2 * | 9/2013 | Tsai | .................... | G02B 6/0036 315/39 |
| 8,602,630 B2 * | 12/2013 | Ohkawa | ........................ | 362/619 |
| 2002/0181223 A1 * | 12/2002 | Ryu | .................... | G02B 6/0036 362/619 |
| 2008/0165307 A1 | 7/2008 | Adachi et al. | | |
| 2009/0091948 A1 * | 4/2009 | Wang et al. | .................. | 362/613 |
| 2009/0268484 A1 * | 10/2009 | Kim | .................... | G02B 6/0036 362/608 |
| 2010/0014318 A1 | 1/2010 | Chi et al. | | |
| 2010/0157197 A1 * | 6/2010 | Lee et al. | ........................ | 349/62 |
| 2010/0165241 A1 * | 7/2010 | Kim et al. | ...................... | 349/61 |
| 2010/0288614 A1 * | 11/2010 | Ender | ........................... | 200/5 A |
| 2010/0309685 A1 * | 12/2010 | McCollum et al. | .......... | 362/612 |

(Continued)

FOREIGN PATENT DOCUMENTS

CN    101583889 A    11/2009
CN    101842738 A    9/2010

(Continued)

*Primary Examiner* — Jessica M Merlin
*Assistant Examiner* — Mark Teets
(74) *Attorney, Agent, or Firm* — Birch, Stewart, Kolasch & Birch, LLP

(57) ABSTRACT

A backlight unit and a display device having the same are discussed. According to an embodiment, the backlight unit includes a light source configured to generate light; and a light guide plate configured to distribute the light received from the light source, the light guide plate including: at least one body, each of the at least one body divided into a plurality of blocks, and a plurality of reflective patterns formed on a bottom surface of the body, wherein the plurality of reflective patterns are selectively provided at some of the plurality of blocks.

14 Claims, 10 Drawing Sheets

(56) References Cited

U.S. PATENT DOCUMENTS

| | | | | |
|---|---|---|---|---|
| 2011/0109843 A1* | 5/2011 | Jung | ................... | G02B 6/0036 |
| | | | | 349/65 |
| 2011/0227895 A1* | 9/2011 | Takahashi | ............ | G02B 6/0061 |
| | | | | 345/211 |
| 2011/0261290 A1 | 10/2011 | Kim et al. | | |
| 2012/0140149 A1* | 6/2012 | Sakita | .............. | G02F 1/133603 |
| | | | | 349/67 |

FOREIGN PATENT DOCUMENTS

| | | |
|---|---|---|
| CN | 102236206 A | 11/2011 |
| CN | 102313203 A | 1/2012 |
| JP | 2004/286803 A | 10/2004 |
| TW | 200634402 A | 10/2006 |
| WO | WO 2009/057844 A1 | 5/2009 |

\* cited by examiner

100

BACKLIGHT UNIT AND LIQUID CRYSTAL DISPLAY DEVICE INCLUDING THE SAME

The present application claims the priority benefit of Korean Patent Application No. 10-2011-0140822 filed in Republic of Korea on Dec. 23, 2011, which is hereby incorporated by reference.

BACKGROUND OF THE INVENTION

1. Field of the Invention

The present invention relates to a backlight unit and a liquid crystal display (LCD) device and more particularly to an edge type backlight unit being capable of performing a local dimming driving and scan driving and an LCD device including the same.

2. Discussion of the Related Art

LCD devices, which are widely used for TV, monitors, TV, and so on because of their high contrast ratio and other characteristics that are suitable to display moving images, display images using an optical anisotropy and polarization properties of liquid crystal molecules.

The LCD device includes a liquid crystal panel. The liquid crystal panel includes a first substrate where a gate line, a data line, a thin film transistor and a pixel electrode are formed, a second substrate where a color filter layer and a common electrode are formed, and a liquid crystal layer which includes the liquid crystal molecules interposed therebetween. The alignment direction of the liquid crystal molecules is changed by an electric field in the liquid crystal panel such that light transmissivity is also controlled.

Generally since the liquid crystal panel does not include a light source therein, an additional light source is required. For example, a backlight unit including a light source is disposed under the liquid crystal panel to provide light onto the liquid crystal panel. The LCD device can display images using the light from the backlight unit.

A fluorescent lamp such as a cold cathode fluorescent lamp (CCFL) and an external electrode fluorescent lamp (EEFL) has been widely used as the light source of the backlight unit. Recently, a light emitting diode (LED) having advantages in power consumption, weight and brightness is developed and used as the light source of the backlight unit.

Generally, the backlight unit is classified into an edge light type and a direct type depending on a position of the light source. In the direct type backlight unit, the light source is positioned throughout directly under the liquid crystal panel such that the light from the light source is directly provided to the liquid crystal panel. In the edge type backlight unit, a light guide plate is disposed under the liquid crystal panel, and the light source is positioned at a side of the light guide plate. The light from the light source in the edge type backlight unit is refracted by the light guide plate to proceed to the liquid crystal panel.

In the direct type backlight unit, a local dimming where different voltages can be applied to each LED such that each LED emits light having a difference in brightness, or a scan driving where different voltages can be applied to each LED string, can be performed. However, more LEDs are required and thus power consumption is increased for the direct type backlight unit than the edge type backlight unit.

The edge type backlight unit has advantages in a production process, weight, a thin profile and power consumption. However, the edge type backlight unit has limitations in a scan driving and a local dimming driving in comparison with the direct type backlight unit.

In view of these limitations associated with the related art, an LCD device having a backlight unit that can provide advantages in weight, a thin profile, power consumption, image quality, etc. is desired.

SUMMARY OF THE INVENTION

Accordingly, the present invention is directed to a backlight unit and an LCD device including the backlight unit that substantially obviate one or more of the problems due to limitations and disadvantages of the related art.

An object of the present invention is to provide an edge type backlight unit capable of performing local dimming driving and scan driving.

Another object of the present invention is to provide an LCD device including the backlight unit and having advantages in weight, power consumption, image quality, and so on.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a backlight unit according to an embodiment of the present invention includes a light guide plate including a body, a light path changing pattern having a lens shape on a top surface of the body and a plurality of reflective patterns on a bottom surface of the body; and a light source facing at least one side surface of the body, wherein a plurality of dot blocks are defined in columns and rows on the bottom surface of the body, and the reflective patterns are formed at a part of the plurality of dot blocks.

In another aspect, a liquid crystal display device includes a liquid crystal panel; and a backlight unit providing a light to the liquid crystal panel, the backlight unit including: a light guide plate including a body, a light path changing pattern having a lens shape on a top surface of the body and a plurality of reflective patterns on a bottom surface of the body; and a light source facing at least one side surface of the body, wherein a plurality of dot blocks are defined in columns and rows on the bottom surface of the body, and the reflective patterns are formed a part of the plurality of dot blocks.

In another aspect, the present invention provides a backlight unit for a display device, comprising: a light source configured to generate light; and a light guide plate configured to distribute the light received from the light source, the light guide plate including: at least one body, each of the at least one body divided into a plurality of blocks, and a plurality of reflective patterns formed on a bottom surface of the body, wherein the plurality of reflective patterns are selectively provided at some of the plurality of blocks.

In another aspect, the present invention provides a liquid crystal display device, comprising: a liquid crystal panel; and a backlight unit configured to provide light to the liquid crystal panel, the backlight unit including a light source configured to generate the light and a light guide plate configured to distribute the light received from the light source, the light guide plate including: at least one body, each of the at least one body divided into a plurality of blocks, and a plurality of reflective patterns formed on a bottom surface of the body, wherein the plurality of reflective patterns are selectively provided at some of the plurality of blocks.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

Figure 1:
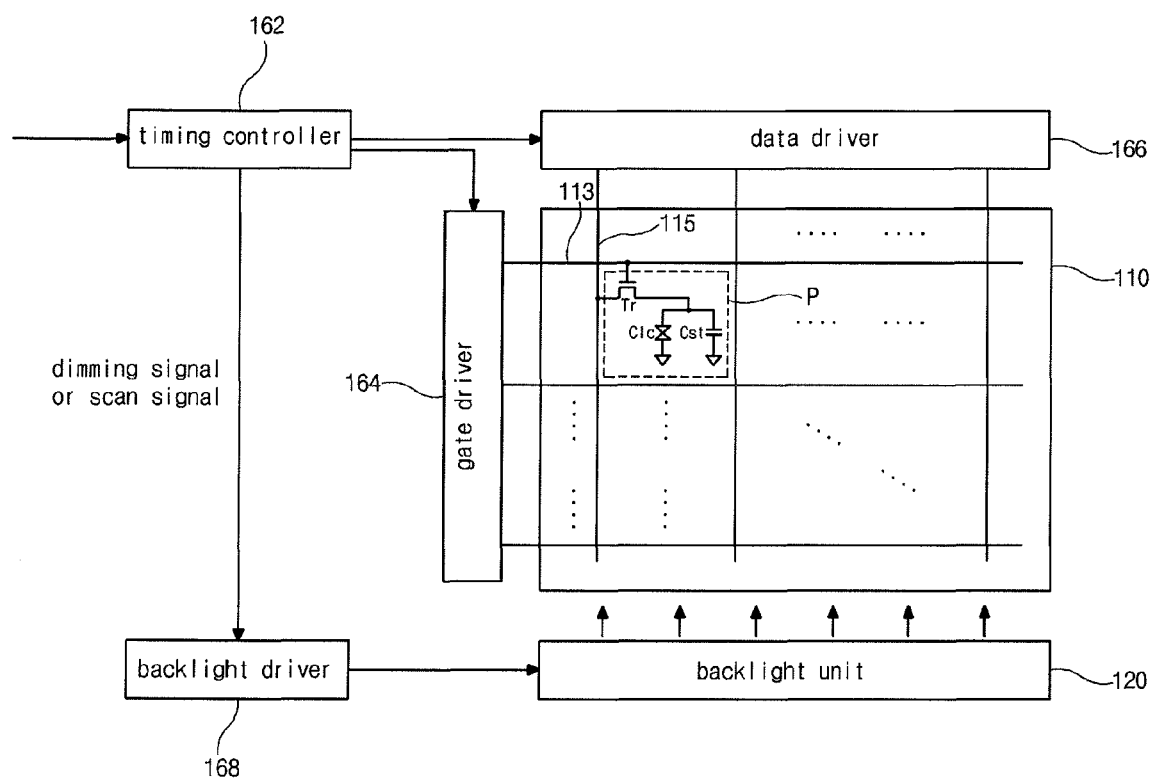
FIG. 1 is a schematic block diagram of a liquid crystal display device according to an embodiment of the present invention.
Figure 2:
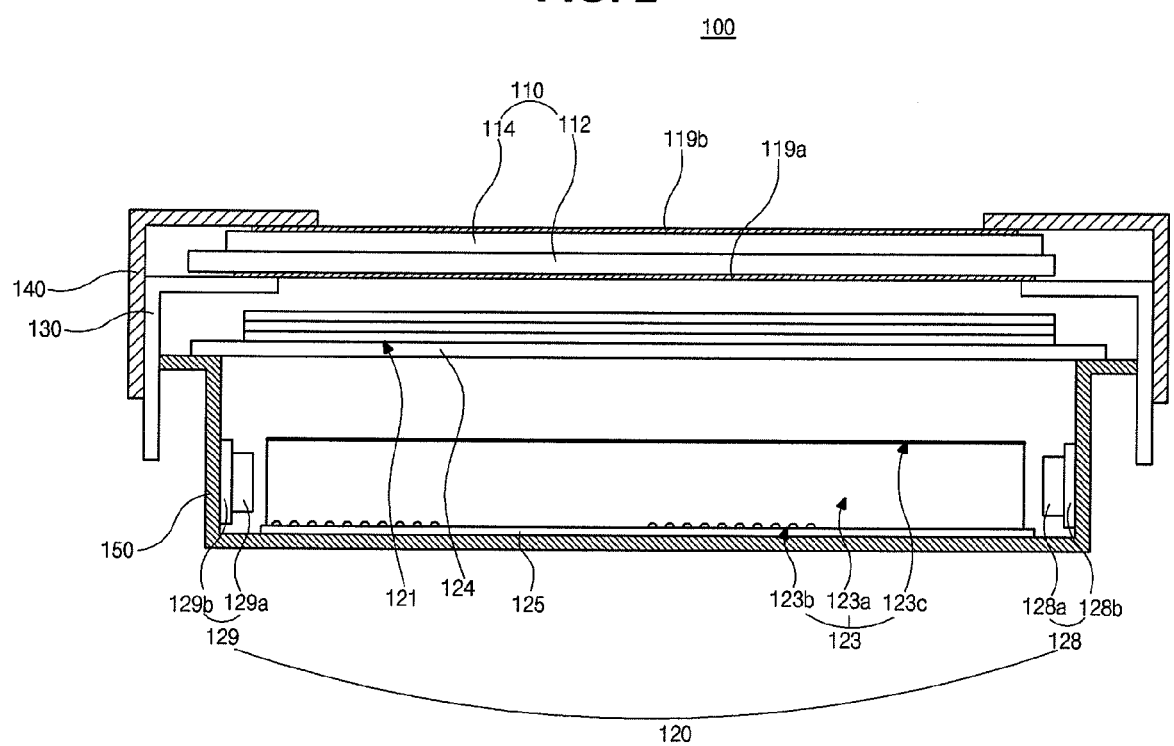
FIG. 2 is a schematic cross-sectional view of an LCD device according to an embodiment of the present invention.

FIG. 1 is a schematic block diagram of a liquid crystal display device according to an embodiment of the present invention, and FIG. 2 is a schematic cross-sectional view of an LCD device according to an embodiment of the present invention.

Referring to FIGS. 1 and 2, an LCD device 100 includes a liquid crystal panel 110 for displaying images, a backlight unit 120 for providing light to the liquid crystal panel 110, a gate driver 164 for applying a gate signal to the gate lines 113 of the liquid crystal panel 110, a data driver 166 for applying a data signal to the data lines 115 of the liquid crystal panel 110, a timing controller 162 for receiving an image signal and a control signal from an outer circuit part and providing a gate control signal to the gate driver 164 and RGB data and a data control signal to the data driver 166, and a backlight driver 168 for receiving a dimming signal or a scan signal from the timing controller 162 and controlling a power of the backlight unit 120.

The liquid crystal panel 110 is a main part for displaying images and includes a first substrate 112, a second substrate 114 facing the first substrate 112, and a liquid crystal layer provided between the first and second substrates 112 and 114.

On the first substrate 112, the gate lines 113 and data lines 115 crossing each other are provided to define a plurality of pixel regions P, and a thin film transistor (TFT) Tr connected to the corresponding gate and data lines 113 and 115 is formed at each intersection of the gate line 113 and data line 115. On the second substrate 114, a black matrix for shielding non-display elements such as the gate lines 113, the data lines 115 and the TFTs Tr, and a color filter layer may be formed. The color filter layer can include red, green and blue color filter patterns and corresponds to the pixel regions P.

In each pixel region P, a liquid crystal capacitor Clc and a storage capacitor Cst are formed. Although not shown, the liquid crystal capacitor Clc includes a pixel electrode and a common electrode. The pixel electrode and the common electrode may be formed on the first substrate 112 such that a horizontal electric field is generated therebetween. Alternatively, the pixel electrode and the common electrode may be formed on the first and second substrates 112 and 114, respectively, such that a vertical electric field is generated therebetween.

At the outer sides of the first and second substrates 112 and 114, first and second polarization plates 119a and 119b may be formed.

The gate driver 164 and the data driver 166 respectively providing the gate signals and the data signals to the gate lines 113 and the data lines 115 are combined along at least one side of the liquid crystal panel 110 as a printed circuit board where a gate driving integrated circuit and a data driving circuit board can be installed. In addition, the timing controller 162 may be formed on the printed circuit board. For the purpose of the present invention, various types of liquid display panels may be provided as the panel 110.

When the TFT Tr is turned on by an on/off gate signal from the gate driver 164, a data signal from the data driver 166 is applied to the liquid crystal capacitor Clc and the storage capacitor Cst through the corresponding data line 115. The electric field is generated between the corresponding pixel and common electrode, and the liquid crystal layer is driven by this electric field. As a result, light transmissivity of the liquid crystal layer is controlled such that the LCD device can produce an image.

The timing controller 162 receives signals such as an image signal, a data enable (DE), a horizontal synchronization signal (HSY), a horizontal synchronization signal (VSY), a clock signal (CLK) and so on, and generates RGB data, the data control signal and the gate control signal. In addition, the timing controller 162 analyzes the data signal in each frame and generates a dimming signal for driving the LEDs in a dot block or a scan signal for driving the LEDs in a line block. The dimming signal or the scan signal is provided to the backlight driver 168.

For example, when the data signal having a low brightness is concentrated on the dot block or the line block, the timing controller 162 analyzes the data signal and converts the data signal in the dot block or the line block to have a higher gray level and generates the dimming signal or the scan signal having a lower duty ratio. The backlight driver 168 receiving the dimming signal or the scan signal applies a current to the LEDs in the dot block or the line block such that the LEDs in the dot block or the line block provides light with a lower brightness to the liquid crystal panel 110. Since the image in the dot block or the line block has the lower brightness, a contrast ratio can be improved.

The brightness decrease in the dot block or the line block is performed by reducing the applied current, and the applied current decrease is performed by reducing the duty ratio. The duty ratio preferably means a ratio of a time of applying on-voltage to a time of applying off-voltage. As the duty ratio is reduced, the LCD device 100 can have a lower power consumption with a high contrast ratio.

On the other hand, when the data signal having a high brightness is concentrated on the dot block or the line block, a contrast ratio can be improved by increasing a current applied to the LEDs. Namely, the timing controller 162 generates a dimming signal or a scan signal having a higher duty ratio and provides it to the backlight driver 168. Although not shown, to generate the dimming signal or the scan signal, the timing controller 162 may further includes a histogram analyzer, a data converter and a duty ratio converter.

The backlight unit 120 includes a light guide plate 123 under the liquid crystal panel 110, a first LED assembly 128 as a first light source, a second LED assembly 129 as a second light source, a reflective sheet 125 under the light guide plate 123, one or more diffusion sheets 124 between the light guide plate 123 and the liquid crystal panel 110, and one or more optical sheets 121 between the diffusion sheet 124 and the liquid crystal panel 110.

The first LED assembly 128 includes first LEDs 128a on a first printed circuit board (PCB) 128b, and the second LED assembly 129 includes second LEDs 129a on a second PCB 129b.

The first LED assembly 128 and the second LED assembly 129 are positioned at opposite sides of the light guide plate 123. Particularly, with a front view of the screen of the LCD device 100, the first and second LED assemblies 128 and 129 are positioned horizontal sides of the light guide plate 123. In other words, the first LEDs 128a in the first LED assembly 128 are horizontally arranged, and the second LEDs 129a in the first LED assembly 129 are horizontally arranged. Preferably the first and second LEDs 128a and 129a are arranged along a direction of the gate lines 113. This may be called as a horizontal edge type backlight unit or a horizontal edge type LCD device.

The light from the first and second LEDs 128a and 129a is refracted and reflected through the light guide plate 123 and provided onto the back of the liquid crystal panel 110.

Each of the first and second PCBs 128b and 129b may be a metal core PCB having a heat emitting property. On a rear side of the metal core PCBs, a heat emitting plate may be formed such that heat from the LEDs 128a and 129a are emitted to the outer space.

The reflective sheet 125 is disposed under the light guide plate 123 and reflects the light toward the liquid crystal panel 110. Preferably the reflective sheet 125 extends to cover the entire bottom surface of the light guide plate 13.

In one example, the light guide plate 123 includes a body 123a, reflective patterns 123b provided on a bottom surface of the body 123a, and a light path changing pattern 123c provided on a top surface of the body 123a. The light path changing pattern 123c entirely covers the top surface of the body 123a, while the reflective patterns 123b partially cover the bottom surface of the body 123a. The backlight unit 120 can perform the local dimming and the scan driving due to the light path changing pattern 123c and the reflective patterns 123b.

The diffusion sheet 124 is disposed over the light guide plate 123 to improve brightness uniformity. The optical sheet 121 is disposed on the diffusion sheet 124 to diffuse or concentrate the light and provide it toward the liquid crystal panel 110. For example, the optical sheet 121 may include a diffusion sheet and at least one light concentration sheet. Further, a gap having a predetermined size is provided between the top surface of the light guide plate 123 and a bottom surface of the diffusion sheet 124. This gap is preferably an air gap.

The liquid crystal panel 110 and the backlight unit 120 are combined using a main frame 130, a top frame 140 and a bottom frame 150. The main frame 130 surrounds edges of the liquid crystal panel 110. The top frame 140 cover edges of the liquid crystal panel 110 and sides of the main frame 130, so the top frame 140 can support and protect of the edges of the liquid crystal panel 110 and sides of the main frame 130. The top frame 140 has an opening to expose a center area of the liquid crystal panel 110. The bottom frame 50 includes a bottom surface covering a rear side of the backlight unit 120 and four side surfaces perpendicularly extending from the bottom surface. The first and second LED assemblies 128 and 129 are arranged at two opposite side surfaces of the bottom frame 150. The main frame 130 is combined with the top frame 140 and the bottom frame 150 for modulation. The top frame 140 may be called as a top case, a top cover or a case top, and the main frame 130 may be called as a guide panel, a main support or a mold frame. The bottom frame 150 may be called as a bottom cover or a lower cover.

In the modulated LCD device, the first and second LEDs 128a and 129a emit the light toward the light guide plate 123, and the light is provided onto the liquid crystal panel 110 through the light guide plate 123, the reflective sheet 125, the diffusion sheet 124 and the optical sheet 121.

Figure 3:
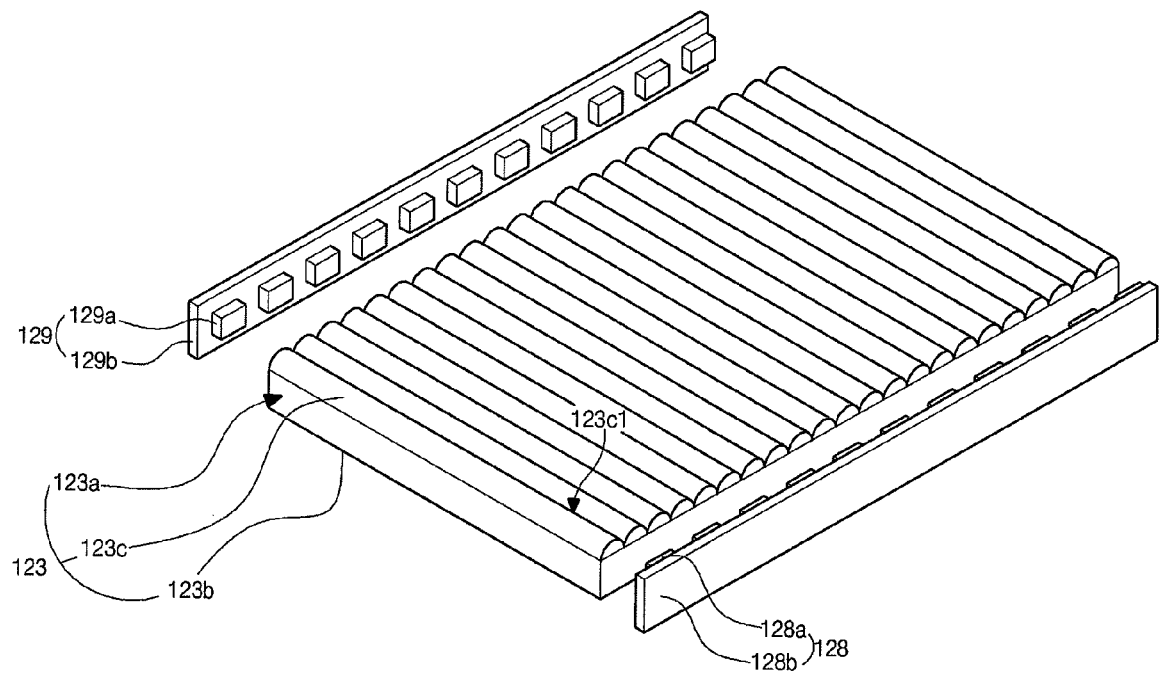
FIG. 3 is a schematic perspective view of an LED assembly and a light guide plate for a backlight unit according to according to an embodiment of the present invention.
Figure 4:
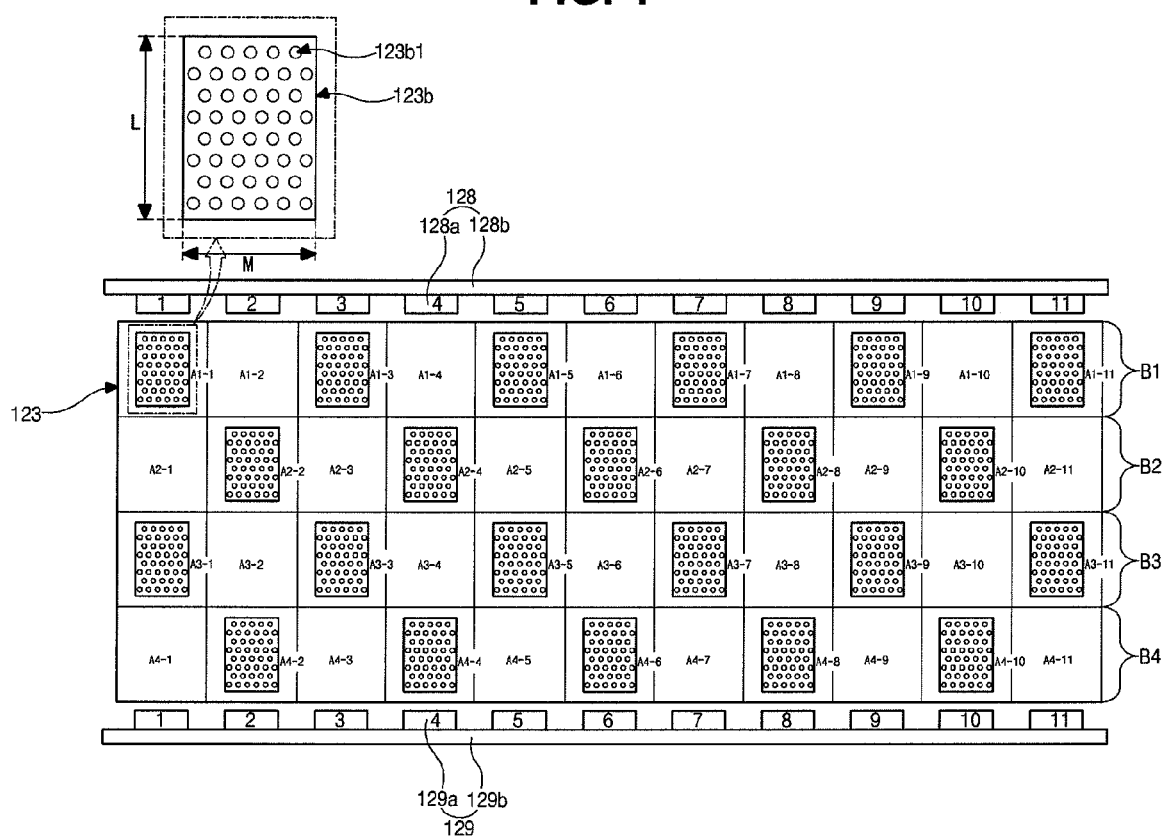
FIG. 4 is a schematic plane view of a rear side of an LED assembly and a light guide plate for a backlight unit according to an embodiment of the present invention.

FIG. 3 is a schematic perspective view of an LED assembly and a light guide plate of a backlight unit of a display device according to according to an embodiment of the present invention, and FIG. 4 is a schematic plane view of a rear side of an LED assembly and a light guide plate of a backlight unit of a display device according to an embodiment of the present invention.

Referring to FIGS. 3 and 4 with FIGS. 1 and 2, the first and second LED assemblies 128 and 129 are arranged at opposite sides of the light guide plate 123. When the light guide plate 123 has two longer sides and two shorter sides, the first and second LED assemblies 128 and 129 are arranged at two longer sides of the light guide plate 123. As mentioned above, this may be called as the horizontal edge type backlight unit. Namely, with a front view of the LCD device, the first and second LED assemblies 128 and 129 are arranged at two horizontal sides. At each longer side of the light guide plate 123, one or more LED assemblies may be disposed.

The light path changing pattern 123c is formed on a top surface of the body 123a of the light guide plate 123 and entirely covers the top surface of the body 123a. The light path changing pattern 123c includes a plurality of lenses 123c1 protruding from the top surface of the body 123a. The lenses 123c1 preferably have a semi-circle shape or a semi-ellipse shape and extend along the shorter side of the light guide plate 123. The lenses 123c1 can be any element that has a lenticular shape on its top surface. In other words, the lenses 123c1 are arranged along the longer side of the light guide plate 123 where each lens extends along the shorter side of the light guide plate 12. Although the lenses 123c1 have the semi-circle or semi-ellipse shape, the lenses 123c1 can be different shapes or configurations. That is, the light path changing pattern 123c can in other pattern or shape. Further, in FIG. 3, two lenses 123c1 correspond to one first LED 128a. Alternatively, at least one LED 128a corresponds to at least one lens 123c1 or each LED 128a can correspond to multiple lenses 123c1 so that the light from one LED 128 can propagate through the multiple lenses 123c1 of the body 123b. Other variations are possible.

The light path changing pattern 123c guides the light from the first and second LEDs 128a and 129a. Namely, a straight path of the light from the first and second LEDs 128a and 129a is secured due to the light path changing pattern 123c. Accordingly, the light refracted and reflected in the light path changing pattern 123c can travel through the light guide plate 123 in a helix shape.

The reflective patterns 123b are formed at the bottom surface of the body 123a of the light guide plate 123 and partially or selectively cover the bottom surface of the body 123a. When the bottom surface of the body 123a of the light guide plate 123 is divided into first to eleventh columns and first to fourth rows such that a plurality of dot blocks A1-1 to A1-11, A2-1 to A2-11, A3-1 to A3-11 and A4-1 to A4-11 are defined, the reflective patterns 123b are alternately arranged in the columns and the rows as shown in FIG. 4. In other words, the reflective patterns 123b are formed at a part of the dot blocks A1-1 to A4-11 such that the bottom surface of the body 123a with the reflective patterns 123b has a check pattern shape. Namely, the reflective patterns 123b are formed at the first, third, fifth . . . eleventh dot blocks A1-1, A1-3, A1-5 and A1-11 in the first row and at the second, fourth, sixth . . . tenth dot blocks A2-2, A2-4, A2-6 . . . A2-10 in the second row. In addition, the reflective patterns 123b are formed at the first, third, fifth . . . eleventh dot blocks A3-1, A3-3, A3-5 and A3-11 in the third row and at the second, fourth, sixth . . . tenth dot blocks A4-2, A4-4, A4-6 . . . A4-10 in the fourth row. In other words, the reflective patterns 123b are formed at odd-numbered dot blocks in odd-numbered rows and at even-numbered dot blocks in even-numbered rows. Alternatively, the reflective patterns 123b may be formed at the even-numbered dot blocks in the odd-numbered rows and at the odd-numbered dot blocks in the even-numbered rows.

In the example of FIG. 4, there exist four dot blocks between two opposing LEDs 128a and 129a, where two dot blocks among such four dot blocks have the reflective patterns 123b in an alternating manner. However, the present invention is not limited thereto and can have a different number of dot blocks between two opposing LEDs of the backlight, where some of the dot blocks can selectively have the reflective patterns 123b to provide an enhanced local dimming operation and an enhanced scanning operation. For instance, between two opposing LEDs of the backlight, there can exist six dot blocks (first column of dot blocks) where two of the six dot blocks selectively have the reflective patterns 123b. In this case, in the first column of dot blocks, the reflective patterns 123b may be provided only in the first and fourth dot blocks. In the second column of dot blocks (immediately right of the first column), the second and fifth dot blocks may only have the reflective patterns 123b. In the third column of dot blocks (immediately right of the second column), the third and sixth dot blocks may only have the reflective patterns. And the set of such three columns of dot blocks is repeatedly and continuously provided between the sets of opposing LEDs 128a and 129a. As such, all the reflective patterns 123b of the light guide plate form multiple diagonal lines. This concept is equally applicable to other embodiments such as the embodiment of FIG. 7.

The light is reflected by the reflective patterns 123b toward the bottom of the liquid crystal panel 110 such that the pixel region P corresponding to the reflective patterns 123b has an improved brightness. When n dot blocks are defined on the bottom surface of the body 123a, the reflective patterns 123b1 may be formed in the n/2 dot blocks while the other remaining dot blocks do not have the reflective patterns.

As mentioned above, the reflective patterns 123b are formed in a checker pattern. Then, if the reflective pattern 123b is disposed at one dot block, the reflective pattern 123b is not disposed at adjacent four dot blocks with respect to that one dot block. Also, when the reflective pattern 123b is not disposed at another one dot block, the reflective pattern 123b is disposed at adjacent four dot blocks with respect to the another one dot block.

As shown in FIG. 4, one of the dot blocks A1-1 to A4-11 corresponds to one of the LEDs 128a and 129a. Alternatively, one of the dot blocks A1-1 to A4-11 may correspond to at least one of the LEDs 128a and 129a. Each reflective pattern 123b has a smaller size than a corresponding one of the dot block A1-1 to A4-11. Namely, a width M and a length L of the reflective pattern 123b is smaller than those of each of the dot blocks A1-1 to A4-11. Since the light is spread by the reflective patterns 123b and the light path changing pattern 123c, it is desirable for the reflective pattern 123b to have a smaller size than each of the dot blocks A1-1 to A4-11.

FIG. 2 shows the reflective pattern 123b concaving toward the body 123a. Alternatively, the reflective pattern 123b may be embossed or protruded from the body 123b toward the reflective sheet 125 whereas FIG. 4 shows that each reflective pattern may be composed of a plurality of reflective dots 123b1 or dot like elements. Each reflective dot 123b1 in the reflective pattern 123b may be a semi-circle shape, a semi-ellipse shape, a polygonal shape, a hologram pattern, or other shape. FIG. 4 shows that the reflective dots 123b1 are uniformly arranged. Alternatively, the reflective dots 123b1 having the same size may be more densely disposed as the reflective dots 123b1 are at a farther distance from the LEDs 128a or 129a. In other words, a density of the reflective dots 123b1 is proportional to its distance from the LEDs. In addition, the reflective dots 123b1 may be larger and have a smaller distance therebetween as the reflective dots 123b1 are at a farther distance from the LEDs 128a or 129a.

The body 123a of the light guide plate 123 may be formed of polymethylmethacrylate (PMMA) or polymethacrylstyrene as a mixture of PMMA and polystyrene.

The light guide plate 123 provides a plane light toward the liquid crystal panel 110. The light guide plate 123 corresponding to the dot blocks A1-1 to A2-11 in the first and second rows provides the plane light using the light from the first LEDs 128a, and the light guide plate 123 corresponding to the dot blocks A3-1 to A4-11 in the third and fourth rows provides the plane light using the light from the second LEDs 129a.

For the sake of explanation, the 1st to 11th dot blocks A1-1 to A1-11 in the first row are defined as a first line block B1, and the 1st to 11th dot blocks A2-1 to A2-11 in the second row are defined as a second line block B2. The 1st to 11th dot blocks A3-1 to A3-11 in the third row are defined as a third line block B3, and the 1st to 11th dot blocks A4-1 to A4-11 in the fourth row are defined as a fourth line block B4.

In the first line block B1, the reflective patterns 123b in the 1st, 3rd, 5th . . . 11th dot blocks A1-1, A1-3, A1-5 . . . A1-11 respectively correspond to the 1st, 3rd, 5th . . . 11th LEDs 128a of the first LED assembly 128. In the second line block B2, the reflective patterns 123b in the 2nd, 4th . . . 10th dot blocks A2-2, A2-4 . . . A2-10 respectively correspond to the 2nd, 4th . . . 10$^{th}$ LEDs 128a of the first LED assembly 128. In the third line block B3, the reflective patterns 123b in the 1st, 3rd, 5th . . . 11th dot blocks A3-1, A3-3, A3-5 . . . A3-11 respectively correspond to the 1st, 3rd, 5th . . . 11th LEDs 129a of the second LED assembly 129. In the fourth line block B4, the reflective patterns 123b in the 2nd, 4th . . . 10th dot blocks A4-2, A4-4 . . . A4-10 respectively correspond to the 2nd, 4th . . . 10th LEDs 129a of the second LED assembly 129.

Brightness in the dot blocks A1-1 to A4-11 depends on the LEDs 128a and 129a and the reflective patterns 123b. In the present invention, when each LEDs emits strong light with a high current, the light from the LEDs affect not only the dot blocks where the reflective patterns 123b are formed, but also affect the dot blocks where the reflective patterns 123b are not formed, in the same row and adjacent to the dot blocks. For example, when the current applied to the first and third LEDs 1 and 3 of the first LED assembly 128 is relatively high, the light through not only the first and third dot blocks A1-1 and A1-3 but also through the second and fourth dot blocks A1-2 and A1-4 (which are adjacent to the first and third dot blocks A1-1 and A1-3) is provided as a strong plane light. Particularly, the second dot blocks A1-2, which is disposed between the first and third dot blocks A1-1 and A1-3, is strongly affected by the first and third LEDs 1 and 3 and the reflective patterns 123b in the first and third dot blocks A1-1 and A1-3. As a result, a uniform light distribution through the light guide plate 123 can be provided.

Figure 5A:
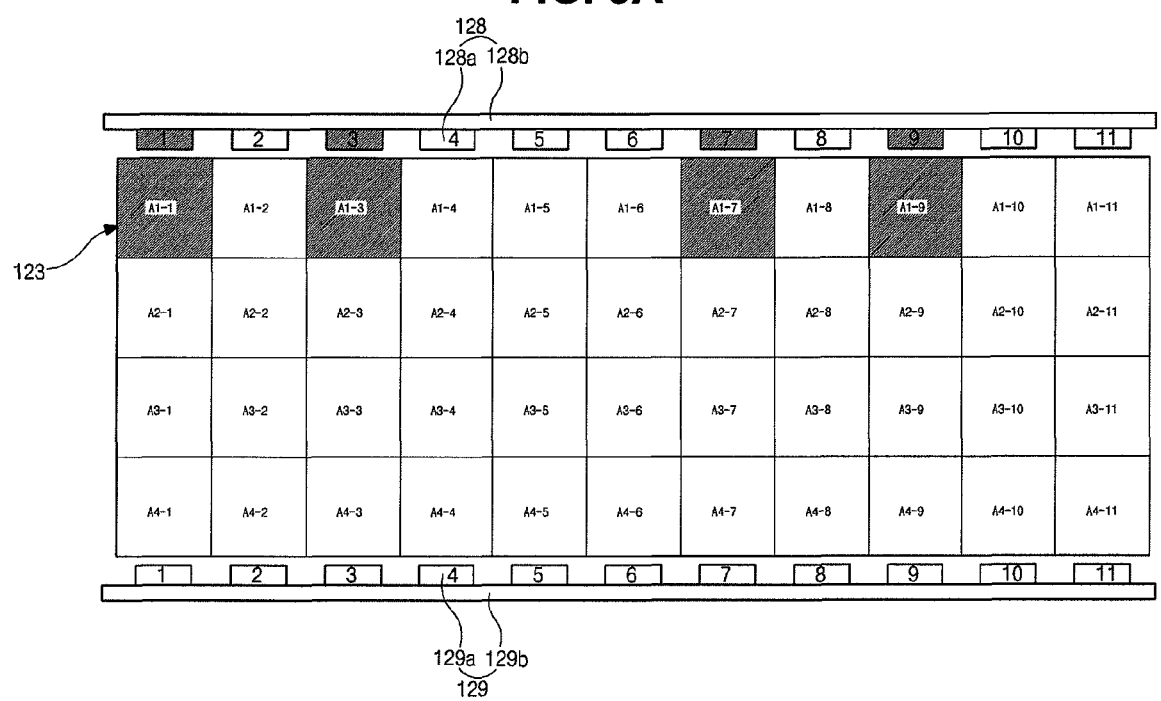
FIGS. 5A and 5B are views illustrating an example of local dimming driving in a backlight unit according to an embodiment of the present invention.
Figure 5B:
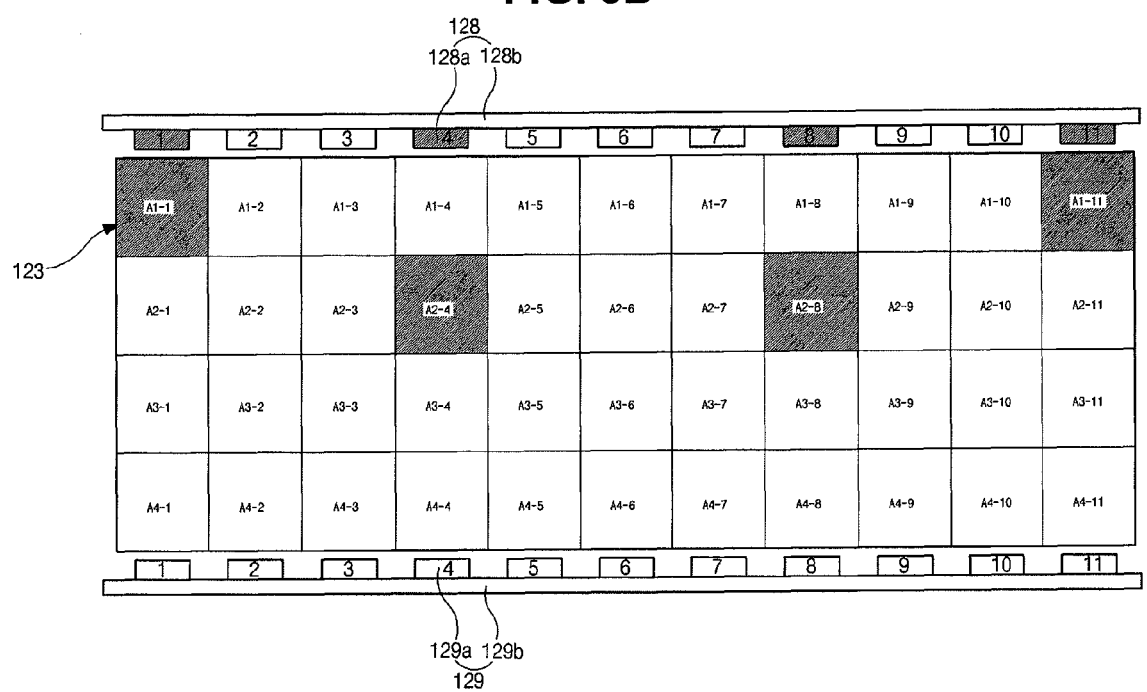
Figure 6A:
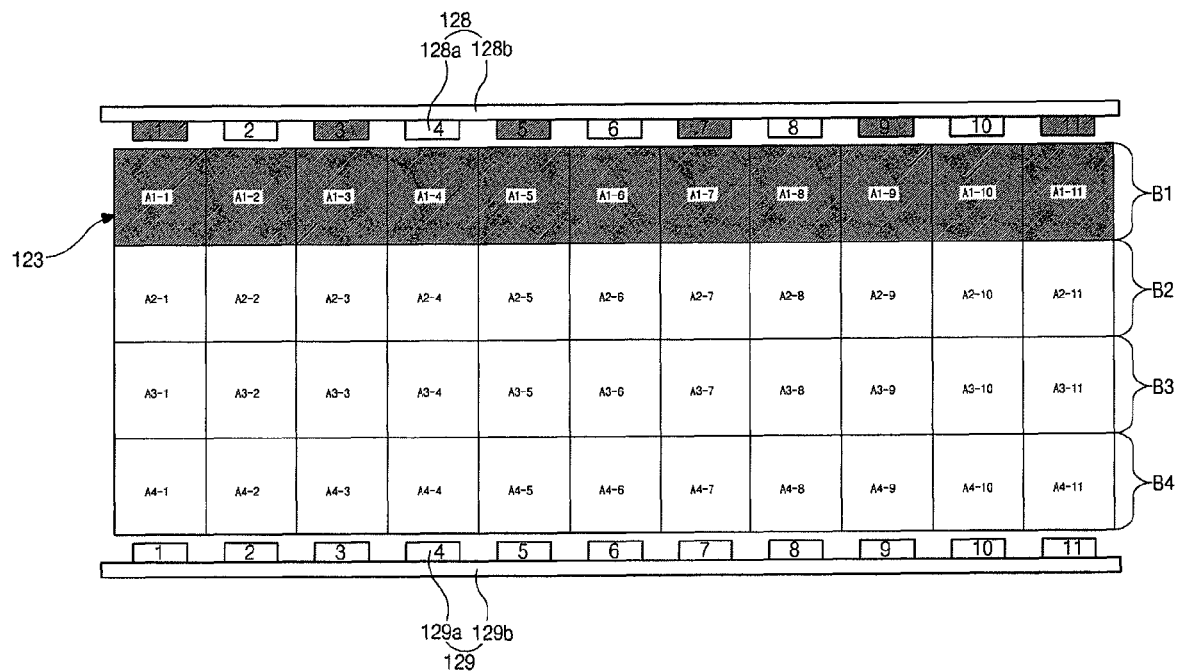
FIGS. 6A and 6B are views illustrating an example of scan driving in a backlight unit according to an embodiment of the present invention.
Figure 6B:
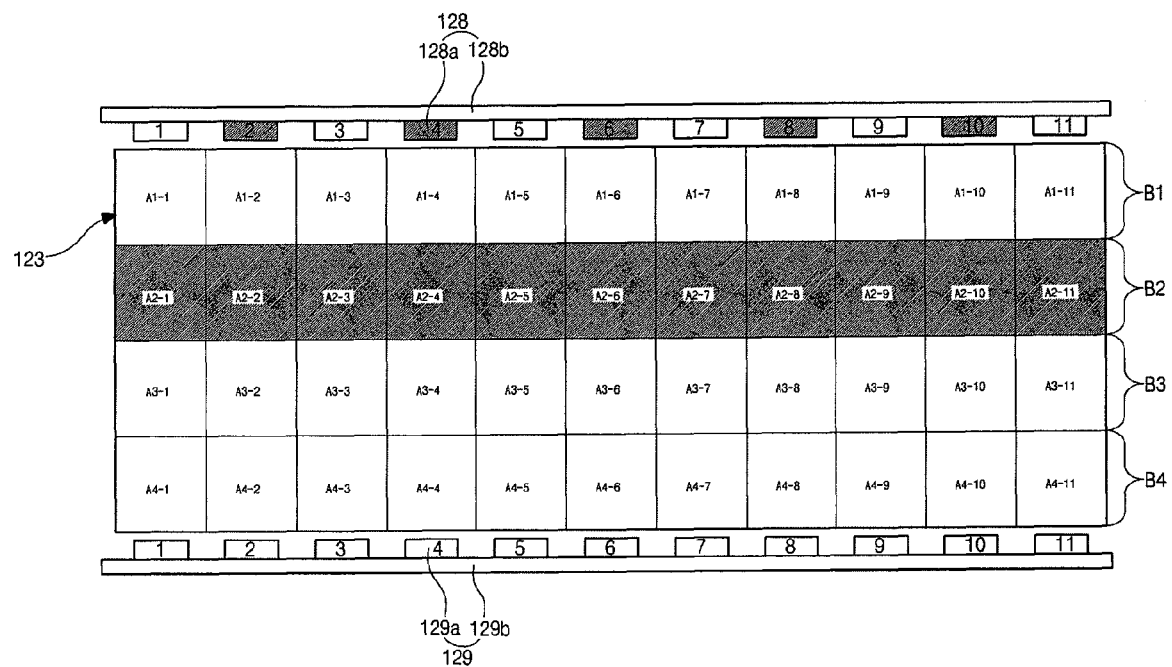

FIGS. 5A and 5B are views illustrating an example of local dimming driving in a backlight unit according to an embodiment of the present invention, and FIGS. 6A and 6B are views illustrating an example of scan driving in a backlight unit according to an embodiment of the present invention. The backlight unit driven in a local dimming or a scan driving is illustrated with references to FIGS. 5A, 5B, 6A and 6B with FIGS. 1-4.

An example of local dimming performed using the backlight unit of the present invention is explained with FIGS. 5A and 5B. Referring to FIG. 5A, when the backlight driver 168 (of FIG. 1), which is controlled by the timing controller 162 of FIG. 1 applies a dimming signal having a first duty ratio to the 1st, 3rd, 7th and 9th LEDs 1, 3, 7 and 9 of the first LED assembly 128, then the 1st, 3rd, 7th and 9th LEDs 1, 3, 7 and 9 of the first LED assembly 128 emit light toward the corresponding parts of the light guide plate 123. The light is then refracted and reflected by the light path changing pattern 123c and the reflective patterns 123b such that the plane light is provided in the 1st, 3rd, 7th and 9th dot blocks A1-1, A1-3, A1-7 and A1-9 of the first row. Due to the reflective patterns 123b in the 1st, 3rd, 7th and 9th dot blocks A1-1, A1-3, A1-7 and A1-9 of the first row, the light in the 1st, 3rd, 7th and 9th dot blocks A1-1, A1-3, A1-7 and A1-9 of the first row has higher a brightness than other dot blocks. Accordingly, the contrast ratio is increased by using the local dimming method.

Referring to FIG. 5B, when the backlight driver 168 (of FIG. 1), which is controlled by the timing controller 162 of FIG. 1 applies a dimming signal having the first duty ratio to the 1st, 4th, 8th and 11th LEDs 1, 4, 8 and 11 of the first LED assembly 128, the 1st, 4th, 8th and 11th LEDs 1, 4, 8 and 11 of the first LED assembly 128 emit the light toward the corresponding parts of the light guide plate 123. The light is refracted and reflected by the light path changing pattern 123c and the reflective patterns 123b such that the plane light is provided in the 1st dot block A1-1 and the 11th dot block A1-11 of the first row and the 4th dot block A2-4 and the 8th dot block A2-8 of the second row. Due to the reflective patterns 123b in the 1st dot block A1-1 and the 11th dot block A1-11 of the first row and the 4th dot block A2-4 and the 8th dot block A2-8 of the second row, the light in the 1st dot block A1-1 and the 11th dot block A1-11 of the first row and the 4th dot block A2-4 and the 8th dot block A2-8 of the second row has a higher brightness than other dot blocks. Accordingly, the contrast ratio is increased and the local dimming is performed by using the selectively positioned reflective patterns 123b of the backlight unit of the present invention.

An example of scan driving performed using the backlight unit of the present invention is explained with FIGS. 6A and 6B. Referring to FIG. 6A, when the backlight driver 168 (of FIG. 1), which is controlled by the timing controller 162 of FIG. 1 applies a scan signal having a second duty ratio, which is larger than the first duty ratio, to the 1st, 3rd, 5th, 7th, 9th and 11th LEDs 1, 3, 5, 7, 9 and 11 of the first LED assembly 128, then the 1st, 3rd, 5th, 7th, 9th and 11th LEDs 1, 3, 5, 7, 9 and 11 of the first LED assembly 128 emit light to the corresponding parts of the light guide plate 123. The light is then refracted and reflected by the light path changing pattern 123c and the reflective patterns 123b such that the plane light is provided in the 1st, 3rd, 5th, 7th, 9th and 11th dot blocks A1-1, A1-3, A1-5, A1-7, A1-9 and A1-11 of the first row. Since the scan signal has the second duty ratio, which is larger than the first duty ratio applied to the LEDs in the local dimming, the current applied to the 1st, 3rd, 5th, 7th, 9th and 11th LEDs 1, 3, 5, 7, 9 and 11 of the first LED assembly 128 is higher such that the light in the 1st, 3rd, 5th, 7th, 9th and 11th dot blocks A1-1, A1-3, A1-5, A1-7, A1-9 and A1-11 of the first row affects the 2nd, 4th, 6th, 8th and 10th dot blocks A1-2, A1-4, A1-6, A1-8 and A-10 in the first row. As a result, the plane light is provided through all dot blocks A1-1, A1-2 . . . A1-11 in the first line block B1. Further, by having the gap between the light guide plate 123 and the diffusion sheet 124 as discussed above in connection with FIG. 2, when the light is reflected off the reflective patterns provided in the 1st, 3rd, 5th, 7th, 9th and 11th dot blocks A1-1, A1-3, A1-5, A1-7, A1-9 and A1-11, the same light is better distributed or better directed to the adjacent dot blocks without the reflective patterns. This provides an effect of illuminating the entire first line block B1 by only illuminating the odd-numbered LEDs, whereby an enhanced scanning operation is provided.

Since the light brightness in the first line block B1 is higher than other line blocks B2, B3 and B4, the contrast ratio is increased by using the scan driving method.

Referring to FIG. 6B, when the backlight driver 168 (of FIG. 1), which is controlled by the timing controller 162 of FIG. 1 applies a scan signal having the second duty ratio into the 2nd, 4th, 6th, 8th and 10th LEDs 2, 4, 6, 8 and 10 of the first LED assembly 128, then the 2nd, 4th, 6th, 8th and 10th LEDs 2, 4, 6, 8 and 10 of the first LED assembly 128 emit light to the corresponding parts of the light guide plate 123. The light is then refracted and reflected by the light path changing pattern 123c and the reflective patterns 123b such that the plane light is provided in the 2nd, 4th, 6th, 8th and 10th dot blocks A2-2, A2-4, A2-6, A2-8 and A2-10 of the second row. Since the scan signal has the second duty ratio, which is larger than the first duty ratio applied to the LEDs in the local dimming, the current applied to the 2nd, 4th, 6th, 8th and 10th LEDs 2, 4, 6, 8 and 10 of the first LED assembly 128 is higher such that the light in the 2nd, 4th, 6th, 8th and 10th dot blocks A2-2, A2-4, A2-6, A2-8 and A2-10 of the second row affects to the 1st, 3rd, 5th, 7th, 9th and 11th dot blocks A2-1, A2-3, A2-5, A2-7, A2-9 and A2-11 of the second row. As a result, the plane light is provided through all dot blocks A2-1, A2-2 . . . A2-11 in the second line block B2. Since the light brightness in the second line block B2 is higher than other line blocks B1, B3 and B4, the contrast ratio is increased and the scan driving operation is performed by using the selectively positioned reflective patterns of the backlight unit of the present invention.

Figure 7:
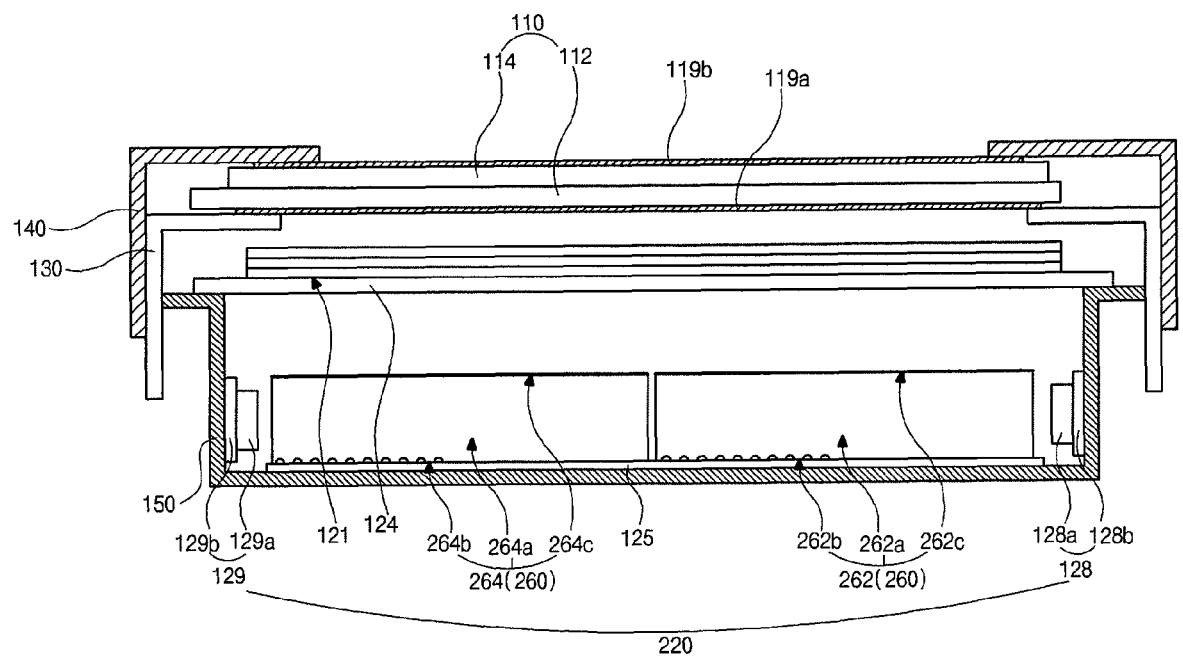
FIG. 7 is a schematic cross-sectional view of an LCD device according to an embodiment of the present invention.
Figure 8:
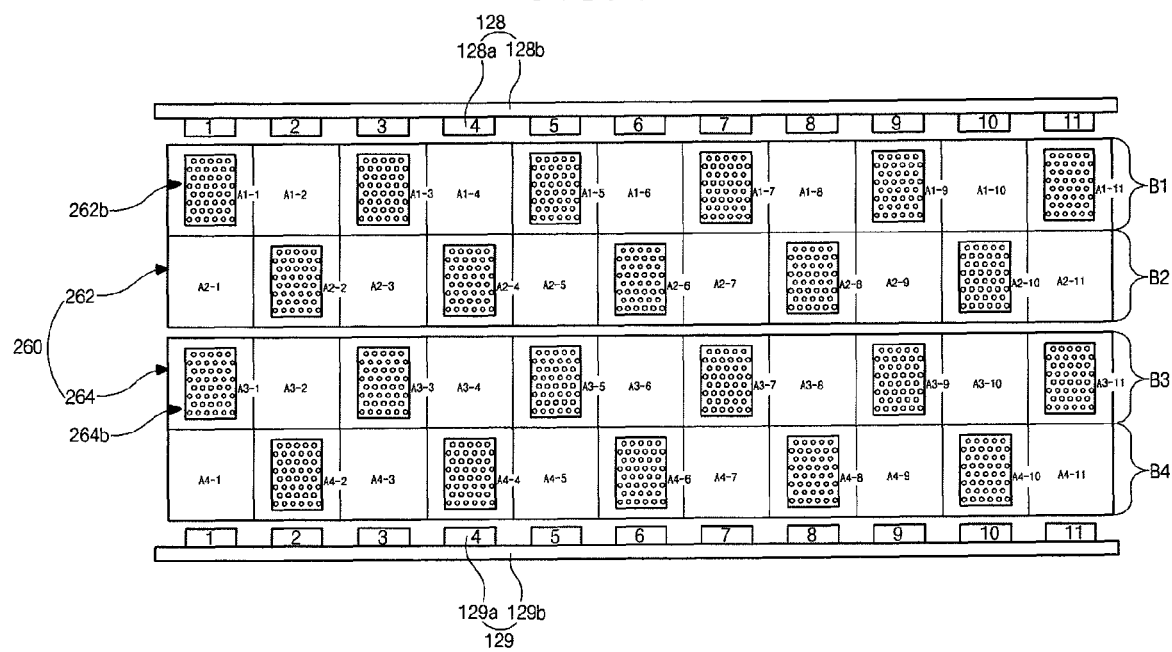
FIG. 8 is a schematic plane view of a rear side of an LED assembly and a light guide plate for a backlight unit according to an embodiment of the present invention.

FIG. 7 is a schematic cross-sectional view of an LCD device according to an embodiment of the present invention, and FIG. 8 is a schematic plane view of a rear side of an LED assembly and a light guide plate of a backlight unit according to an embodiment of the present invention. In this embodiment, there are differences in the light guide plate. Accordingly, the explanation is focused on the light guide plate.

Referring to FIG. 7, the LCD device 200 includes a liquid crystal panel 110, a backlight unit 220, a main frame 130, a top frame 140 and a bottom frame 150. The main frame 130 is combined with the top frame 140 and the bottom frame 150 for modulation of the liquid crystal panel 110 and the backlight unit 220.

The backlight unit 220 includes a light guide plate 260 disposed under the liquid crystal panel 110, a first LED assembly 128 as a first light source, a second LED assembly 129 as a second light source, a reflective sheet 125 under the light guide plate 260, at least one diffusion sheet 124 between the light guide plate 260 and the liquid crystal panel 110, and at least one optical sheet 121 between the diffusion sheet 124 and the liquid crystal panel 110.

The first LED assembly 128 includes first LEDs 128a on a first printed circuit board (PCB) 128b, and the second LED assembly 129 includes second LEDs 129a on a second PCB 129b.

The first LED assembly 128 and the second LED assembly 129 are positioned at opposite sides of the light guide plate 260. Particularly, with a front view of the screen of the LCD device 100, the first and second LED assemblies 128 and 129 are positioned horizontal sides of the light guide plate 260. In other words, the first LEDs 128a in the first LED assembly 128 are horizontally arranged along one longer side of the liquid crystal panel 110, and the second LEDs 129a in the first LED assembly 129 are horizontally arranged along the other longer side of the liquid crystal panel 110. In one example, the LCD device 200 can have the same structure and operations as the LCD device 100 of FIG. 2, except for the structure and operation of the light guide plate 260 (which replaces the light guide plate 123).

More specifically, referring to FIG. 8 with FIG. 7, the light guide plate 260 includes a first light guide plate pattern (first sub light guide plate) 262 and a second light guide plate pattern (second sub light guide plate) 264. The first light guide plate pattern 262 includes a body 262a, a reflective pattern 262b on a bottom surface of the body 262a, and a light path changing pattern 262c on a top surface of the body 262. Similarly, the second light guide plate pattern 264 includes a body 264a, a reflective pattern 264b on a bottom surface of the body 264a, and a light path changing pattern 264c on a top surface of the body 264a. Each of the first and second light guide plate patterns 262 and 264 can have the same outer configuration as the light guide plate 123 of FIG. 2. One side of the first light guide plate pattern 262 faces the first LED assembly 128, and the other side, which is opposite to the one side, of the first light guide plate pattern 262 faces the second light guide plate pattern 264. In addition, one side of the second light guide plate pattern 264 faces the second LED assembly 129, and the other side, which is opposite to the one side of the second light guide plate pattern 264, of the second light guide plate pattern 264 faces the first light guide plate pattern 262.

At least one of the sides of the first and second light guide plate patterns 262 and 264 that directly face each other may be reflective to maximize light propagation and distribution and may be referred to herein as a reflective side. For example, a reflective element such as a reflective tape may be attached to each of at least one reflective side of the first and second light guide plate patterns 262 and 264. Alternatively, a reflective layer may be formed on each of at least one reflective side of the first and second light guide plate patterns 262 and 264 by coating a reflective ink. In another example, a reflective plate may be positioned between the sides of the first and second light guide plate patterns 262 and 264 that directly face each other. In other examples, instead of the reflective elements, layers, plates, etc., an absorption layer may be provided on the reflective side. For instance, an absorptive tape or plate for absorbing the light impinging thereon may be provided on the reflective side(s).

Since the light guide plate 260 is divided into two parts of the first and second light guide plate patterns 262 and 264, light interference between adjacent line blocks or dot blocks is prevented. With a single light guide plate 123 in FIG. 2, the light from the first LED assembly 128 is provided to the dot blocks in the third and fourth line blocks B3 and B4 (of FIG. 3) and may be to the dot blocks in the first and second line blocks B1 and B2 (of FIG. 3) such that an increase of the contrast ratio due to the local dimming or the scan driving may be reduced. As a variation, however, in the LCD device in FIGS. 7 and 8, with the light guide plate 260 divided into the first and second light guide plate patterns 262 and 264, the light interference by adjacent line blocks or dot blocks is blocked such that the increase of the contrast ratio due to the local dimming or the scan driving can be secured. Namely, the dot blocks A1-1, A1-2 . . . A1-11, A2-1, A2-2 . . . A2-11 in the first light guide plate pattern 262 and the dot blocks A3-1, A3-2 . . . A3-11, A4-1, A4-2 . . . A4-11 in the second light guide plate pattern 264 are independently driven such that the contrast ratio is further improved.

In the present invention, the light guide plate of the backlight unit for the LCD device includes the light path changing pattern preferably on the entire the top surface of the body of the light guide plate and the reflective pattern on parts of the bottom surface of the body of the light guide plate. With the above structure, the backlight unit can be driven efficiently by using a local dimming or scan dimming method. As a result, the contrast ratio of the LCD device is improved.

In addition, since the backlight unit is a horizontal edge type, there are advantages of a light weight, a thin profile, low power consumption, and so on.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A backlight unit for a display device, the backlight unit comprising:
 a plurality of left light sources in vertically aligned assemblies, respectively, and a plurality of right light sources in vertically aligned assemblies, respectively, wherein the left and right light sources are configured to generate light, and wherein there is only a single row of light sources including each of the left light sources opposite to and facing, respectively, each of the right light sources;
a light guide plate horizontally aligned and configured to distribute the light received from the left and right light sources; and
at least one diffusion sheet on the light guide plate,
the light guide plate including:
at least one body, each of the at least one body divided into a plurality of blocks, and
a plurality of reflective patterns formed in a checkered pattern configuration on a bottom surface of the at least one body, the plurality of reflective patterns including first dot blocks closer to nearest corresponding light sources than second dot blocks,
wherein the plurality of reflective patterns formed in the checkered pattern configuration on one of the at least one body include the first dot blocks aligned to be positioned between odd numbered left and right light sources in the single row of light sources but not between even numbered left and right light sources, and the plurality of reflective patterns formed in the checkered pattern configuration on the one body include the second dot blocks aligned to be positioned between the even numbered left and right light sources in the single row of light sources but not between the odd numbered left and right light sources,
wherein a plurality of second reflective dots in all the second dot blocks are more densely disposed than a plurality of first reflective dots in all the first dot blocks, and the more densely disposed second reflective dots in all the second dot blocks are larger than the less densely disposed first reflective dots in all the first dot blocks,
wherein sizes of all the reflective patterns are equal,
wherein densities of all the more densely disposed second reflective dots in the second dot blocks are equal, and densities of all the less densely disposed first reflective dots in the first dot blocks are equal,
wherein the light guide plate further includes at least one light path changing pattern in a shape of lenses protruding from a top surface of the at least one body,
wherein the at least one light path changing pattern and the at least one body are integrated to each other to form the light guide plate, and
wherein there is only one light guide plate and all the reflective patterns are formed on the same surface of the light guide plate.

2. The backlight unit of claim 1, wherein the at least one light path changing pattern covers the entire top surface of the at least one body.

3. The backlight unit of claim 1, wherein a width of each of the plurality of reflective patterns is substantially equal to a width of a corresponding one of the left right sources or a corresponding one of the right light sources, and the width of each of the plurality of reflective patterns is less than a width of a corresponding one of the blocks such that adjacent reflective patterns are spaced apart from each other by a distance being larger than the width of each reflective pattern.

4. The backlight unit of claim 1, wherein each of the plurality of reflective patterns includes a plurality of protrusions or indentations.

5. The backlight unit of claim 1, wherein the left and right light sources include light emitting diodes (LEDs), respectively, extending along opposite sides of the light guide plate, and each of the LEDs is positioned to correspond with one of the plurality of blocks.

6. The backlight unit of claim 1, wherein the more densely disposed second reflective dots in each of the second dot blocks are uniformly arranged, and the less densely disposed first reflective dots in each of the first dot blocks are uniformly arranged, and
wherein each of the first dot blocks in which the uniformly arranged less densely disposed first reflective dots are disposed are separated, respectively, by first blocks not having reflective patterns, and each of the second dot blocks in which the uniformly arranged more densely disposed second reflective dots are disposed are separated, respectively, by second blocks not having reflective patterns.

7. A liquid crystal display device, comprising:
a liquid crystal panel; and
a backlight unit configured to provide light to the liquid crystal panel, the backlight unit including:
a plurality of left light sources in vertically aligned assemblies, respectively, and a plurality of right light sources in vertically aligned assemblies, respectively, wherein the left and right light sources are configured to generate light, and wherein there is only a single row of light sources including each of the left light sources opposite to and facing, respectively, each of the right light sources;
a light guide plate horizontally aligned and configured to distribute the light received from the left and right light sources;
at least one diffusion sheet on the light guide plate,
the light guide plate including:
at least one body, each of the at least one body divided into a plurality of blocks, and
a plurality of reflective patterns formed in a checkered pattern configuration on a bottom surface of the at least one body, the plurality of reflective patterns including first dot blocks closer to nearest corresponding light sources than second dot blocks, wherein the plurality of reflective patterns formed in the checkered pattern configuration on one of the at least one body include the first dot blocks aligned to be positioned between odd numbered left and right light sources in the single row of light sources but not between even numbered left and right light sources, and the plurality of reflective patterns formed in the checkered pattern configuration on the one body include the second dot blocks aligned to be positioned between the even numbered left and right light sources in the single row of light sources but not between the odd numbered left and right light sources, wherein a plurality of second reflective dots in all the second dot blocks are more densely disposed than a plurality of first reflective dots in all the first dot blocks, and the more densely disposed second reflective dots in all the second dot blocks are larger than the less densely disposed first reflective dots in all the first dot blocks, wherein sizes of all the reflective patterns are equal, wherein densities of all the more densely disposed second reflective dots in the second dot blocks are equal, and densities of all the less densely disposed first reflective dots in the first dot blocks are equal, wherein the light guide plate further includes at least one light path changing pattern having lenses protruding from a top surface of the at least one body, and wherein the at least one light path changing pattern and the at least one body are integrated to each other to form the light guide plate; and a bottom frame including a left side surface and a right side surface,
wherein the left light sources are disposed on the left side surface of the bottom frame and the right light sources are disposed on the right side surface of the bottom frame.

8. The liquid crystal display device of claim 7, wherein the at least one light path changing pattern covers the entire top surface of the at least one body.

9. The liquid crystal display device of claim 7, wherein each of the plurality of reflective patterns has a size less than a size of a corresponding one of the blocks.

10. The liquid crystal display device of claim 7, wherein each of the plurality of reflective patterns includes a plurality of protrusions or indentations.

11. The liquid crystal display device of claim 7, wherein the left and right light sources include light emitting diodes (LEDs), respectively extending along opposite sides of the light guide plate, and each of the LEDs is positioned to correspond with one of the plurality of blocks.

12. The liquid crystal display device of claim 7, wherein the plurality of left light sources are positioned at a first side of the light guide plate, and the plurality of right light sources are positioned at a second side, which is opposite to the first side, of the light guide plate, and
wherein a length of a groove of the at least one light path changing pattern is perpendicular to the first side of the light guide plate.

13. A backlight unit for a display device, the backlight unit comprising:
a plurality of left light sources in vertically aligned assemblies, respectively, and a plurality of right light sources in vertically aligned assemblies, respectively, wherein the left and right light sources are configured to generate light, and wherein there is only a single row of light sources including each of the left light sources opposite to and facing, respectively, each of the right light sources; and
a light guide plate horizontally aligned and configured to distribute the light received from the left and right light sources,
the light guide plate including:
a first body divided into a plurality of first blocks, a first light path changing pattern having the predetermined shape and formed on a top surface of the first body, and a plurality of first reflective patterns formed on a bottom surface of the first body; and
a second body divided into a plurality of second blocks, a second light path changing pattern having the predetermined shape and formed on a top surface of the second body, and a plurality of second reflective patterns formed on a bottom surface of the second body,
wherein the first and second bodies are positioned adjacent to each other such that the first and second bodies are disposed between the left light sources and the right light sources in parallel,
wherein the plurality of first reflective patterns and the plurality of second reflective patterns are selectively provided at some of the first plurality of blocks and the second plurality of blocks, respectively, and at least one of sides of the first and second bodies that directly face each other includes a reflective element or an absorptive element,
wherein the first reflective patterns are formed in a checkered pattern configuration, and the second reflective patterns are formed in a checkered pattern configuration,
wherein the first reflective patterns formed in the checkered pattern configuration include odd numbered dot blocks which are closer to nearest corresponding light sources than even numbered dot blocks, and the odd numbered dot blocks closer to nearest corresponding light sources in the first reflective patterns are aligned to be positioned between odd numbered left and right light sources in the single row of light sources but not between even numbered left and right light sources,
wherein the second reflective patterns formed in the checkered pattern configuration include even numbered dot blocks which are closer to nearest corresponding light sources than odd numbered dot blocks, and the even numbered dot blocks closer to nearest corresponding light sources in the second reflective patterns are aligned to be positioned between even numbered left and right light sources in the single row of light sources but not between odd numbered left and right light sources, and
wherein sizes of all the reflective patterns are equal.

14. A liquid crystal display device, comprising:
a liquid crystal panel; and
a backlight unit configured to provide light to the liquid crystal panel, the backlight unit including:
a plurality of left light sources in vertically aligned assemblies, respectively, and a plurality of right light sources in vertically aligned assemblies, respectively, wherein the left and right light sources are configured to generate light, and wherein there is only a single row of light sources including each of the left light sources opposite to and facing, respectively, each of the right light sources; and
a light guide plate horizontally aligned and configured to distribute the light received from the left and right light sources,
the light guide plate including:
a first body divided into a plurality of first blocks, a first light path changing pattern having the predetermined shape and formed on a top surface of the first body, and a plurality of first reflective patterns formed on a bottom surface of the first body; and
a second body divided into a plurality of second blocks, a second light path changing pattern having the predetermined shape and formed on a top surface of the second body, and a plurality of second reflective patterns formed on a bottom surface of the second body,
wherein the first and second bodies are positioned adjacent to each other such that the first and second bodies are disposed between the left light sources and the right light sources in parallel,
wherein the plurality of first reflective patterns and the plurality of second reflective patterns are selectively provided at some of the first plurality of blocks and the second plurality of blocks, respectively, and at least one of sides of the first and second bodies that directly face each other includes a reflective element or an absorptive element,
wherein the first reflective patterns are formed in a checkered pattern configuration, and the second reflective patterns are formed in a checkered pattern configuration, wherein the first reflective patterns formed in the checkered pattern configuration include odd numbered dot blocks which are closer to nearest corresponding light sources than even numbered dot blocks, and the odd numbered dot blocks closer to nearest corresponding light sources in the first reflective patterns are aligned to be positioned between odd numbered left and right light sources in the single row of light sources but not between even numbered left and right light sources, wherein the second reflective patterns formed in the checkered pattern configuration include even numbered dot blocks which are closer to nearest corresponding light sources than odd numbered dot blocks, and the even numbered dot blocks closer to nearest corresponding light sources in the second reflective patterns are aligned to be positioned between the even numbered left and right light sources in the single row of light sources but not between the odd numbered left and right light sources, and wherein sizes of all the reflective patterns are equal.

* * * * *